Feb. 16, 1954          W. D. MACGEORGE          2,669,684
CONTROL CIRCUIT FOR A SERIES WOUND REVERSIBLE MOTOR
Filed July 12, 1950
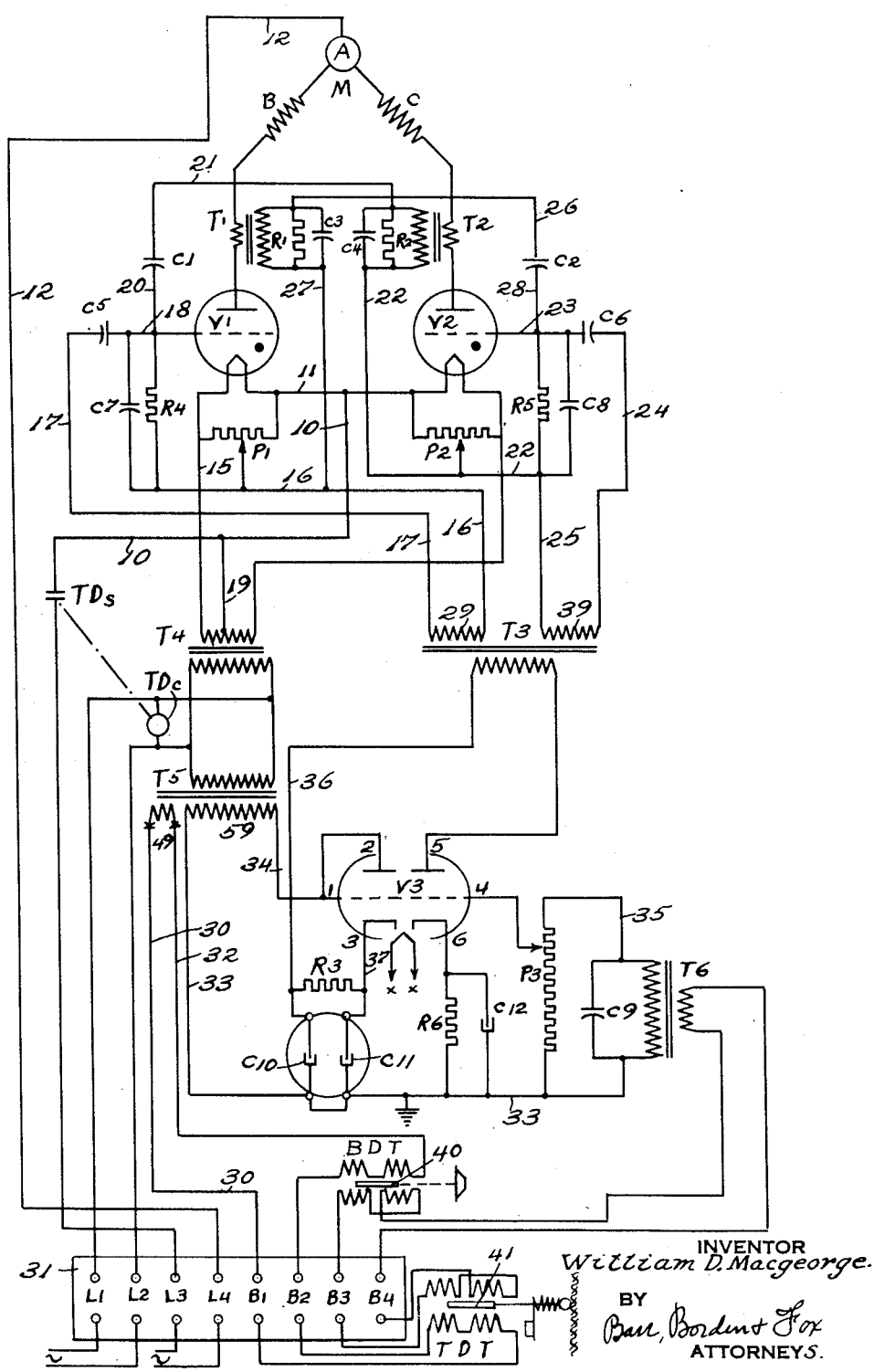
INVENTOR
William D. Macgeorge.
BY
Barr, Borden & Fox
ATTORNEYS.

Patented Feb. 16, 1954

2,669,684

UNITED STATES PATENT OFFICE 2,669,684

CONTROL CIRCUIT FOR A SERIES WOUND REVERSIBLE MOTOR

William D. Macgeorge, Collegeville, Pa., assignor to Automatic Temperature Control Co., Inc., Philadelphia, Pa., a corporation of Pennsylvania Application July 12, 1950, Serial No. 173,312

10 Claims. (Cl. 318—252)

This invention relates to motor control circuits, and particularly to a control circuit for a series wound reversible motor.

There are many applications for the use of reversible series wound D. C. motors of small through moderately large sizes which can be easily and quickly started and stopped, in conjunction with a condition-responsive pick-up device having a movable element, the position of which controls the phase and amplitude of a signal output and which element is positionable by the expenditures of minute forces through minute distances on the movable element of the pick-up device using a purely electronic contactless circuit.

A typical example of such application, which may be cited for illustrative purposes, is the control of the tension of a moving web or strand or the like moving from one driven roller or pair of rollers through fabricating or processing steps to or through another roller or pair of rollers, with the roller at each stage independently driven and the speeds of the respective rollers coordinated to maintain a given datum tension on the web. Usually the rollers are driven at variable speeds from a motor of more or less constant speed, by means of a stepless variable drive of a wide range of output ratios. The series wound D. C. motor of this invention by its running in the purely illustrative use mentioned is used to change the ratio of one of the drives in the series of two driven rollers, in response to deviations in the tension of the traveling web from a datum tension to substantially restore the datum tension. Obviously, the invention is adapted for a much wider range of utility than the specific illustration given, both in the actuation of the pick-up signalling device, and in the utilization of the actuated motor of the circuit.

It is among the objects of this invention to improve the art of motor regulation; to provide a circuit incorporating gas-filled tubes for controlling a reversible series D. C. motor; to provide a circuit for remotely and reversibly controlling a series wound D. C. motor from the output of a small differential transformer having an armature movable in response to minute forces thereon and also having minute movements relative to the transformer; to provide a circuit incorporating gas-filled tubes for reversely controlling the running of a series wound D. C. motor without the use of relays and contactors normally employed in connection with the use of such tubes; to provide a control circuit for a series wound D. C. motor utilizing pulses, the rate and duration of which are functions of the output of an associated differential transformer; to provide a D. C. series wound motor-regulating system by which gradual speed increase and decrease can be effected on either side of a control point to prevent overshoot; to provide a D. C. motor control for a reversible series wound D. C. motor free from hunting and with quick stopping; to provide a series wound D. C. motor-regulating system in which the motor speed established by a given controlling signal from a transmitter tends to remain constant with variations of the load on the motor; to provide a series wound D. C. motor-regulating system with a pick-up signalling device actuated by and in response proportional to variations of tension of a tensioned element; to adapt a series wound D. C. motor control circuit to operation in one direction at variable speeds; to provide a motor-regulating system which is substantially immune to line voltage variations; to provide a D. C. motor-regulation using gas tubes in an electronic control in which the control rate utilizes feed back as a function primarily of the magnetic properties of the field as opposed to the mechanical functions of the armature; to provide improvements on the hereinafter recited application Serial Number 156,688; and to provide other advantages as will appear as the description proceeds.

This invention constitutes improvements on the D. C. motor regulating system disclosed in the application of Macgeorge and Cross, filed April 18, 1950, Serial Number 156,688, although certain of the parts and the functioning of the parts are substantially identical with those of certain parts of the circuit disclosed in said application. Some important distinctions therefrom are: the simplification of the circuit; the use of much more transitory feed back from the field, as a function of the decay of the instantaneously energized field, as opposed to the more prolonged feed back emission of the shunt wound motor involving mechanical properties of the armature, in determining the rate of firing pulse production from the amplified signals from the controlling differential transformer; the cheapening of its manufacture; the elimination of certain of the parts; and the control of a series wound reversible D. C. motor instead of the shunt field motor of the co-pending disclosure with its feed-back problems.

In the accompanying drawing, the figure represents a wiring diagram of the illustrative elements of the motor control system incorporated in a system including a series wound reversible D. C. motor having two fields and an armature in series.

Referring to the wiring diagram, a terminal board 31 or the like is provided for convenience having terminals L1, L2, L3, L4, and B1, B2, B3, and B4 respectively. From the board, lines L1 and L2 lead through time delay relay TDc to the primaries of transformers T4 and T5 in parallel. A given time interval after closing the circuit from lines L1 and L2, the time delay relay switch TDs is closed, connecting the line from L3 through switch TDs, connector 10, to the common connection 11 for the adjacent sides of the respective cathodes of the gas-filled tubes V1 and V2 of the "Thyratron" type. This is the only relay in the circuit, and as it remains closed through all operations of the electronic circuit, it has no make and break functions in the controlled running of the motor M to be described.

The anode of tube V1 leads, through the primary of transformer T1 to field B of motor M, and through the armature A thereof by connector 12, back to the line L4. The anode of tube V2 leads through the primary of transformer T2 to field C of the motor M, and through the armature A thereof by line 12 back to the line L4. It will be understood that the firing of a single given tube will cause an energizing flow through the tube and through the associated field and armature in series to drive the motor M in a given direction, and with the firing of the other tube through the other field and armature in series to drive the motor M in the opposite direction. Lines L1 and L2, and lines L3 and L4, are for connection to the same or phasewisely related sources of voltage, preferably the same voltage source, suitably lead to the terminal board elements. The time delay relay TDc is to permit the tubes to properly warm up before they are permitted to be fired.

The connector 11 extending between the cathodes of the respective tubes V1 and V2, in addition to completing the line of power voltage from L3 to the respective cathodes for passage as electron streams through the respective tubes to the anodes thereof and through the motor M to L4 as noted, is part of a circuit for applying a sharply controlled small negative grid bias on the tubes. Any desired means can be used for impressing a bias on the grid. For illustrative purposes, potentiometers are used. To this end, potentiometer P1 is connected to connector 11 outside of and bridging the cathode of tube V1, as the other end of the potentiometer joins connector 15 leading from the other side of said cathode to one terminal of the secondary of transformer T4 outside of said cathode. The secondary of transformer T4 has a voltage dividing center tap connection 19 joined to connector 10 and thus to connector 11. The arm of potentiometer P1 is joined to a connector 16 extending in one direction to one terminal of a secondary 29 of a transformer T3, the primary of which is energized by the twin triode tube V3 to be described. The other terminal of said secondary 29 of transformer T3 leads by connector 17 through condenser C5 to connector 18, leading to the grid of the tube V1, and having parallel connections through condenser C7 and resistance R4, with the connector 16 joined to the arm of potentiometer P1. A cross connection between the grid of tube V1 and the transformer T2 in the anode circuit of tube V2 is made by the connector 20 joining connector 18 for the grid of the tube V1 at its jointure with the resistance R4, leading to one side of condenser C1 and on the other side of the condenser through connector 21 joined to a resistance R2, bridging the output of the secondary of transformer T2, and in parallel with a condenser C4. A connector 22 leads from the resistance R2 and condenser C4 to complete these parallel connections and to the arm of a potentiometer P2, and to resistance R5 and condenser C8 to couple these at one end in parallel. These latter elements are connected at their opposite ends through connector 23 to the grid of the tube V2, and through condenser C6, by connector 24 to one terminal of another secondary 39 of the transformer T3. The other terminal of the secondary 39 of T3 through connector 25 leads to connector 22 and to the parallel resistance R5 and condenser C8. Grid connector 23 on the other side of R5 and C8 by a connector 28 leads to one side of a condenser C2. A connector 26 from the other side of condenser C2 leads to one terminal of the secondary of transformer T1, and through bridging resistance R1 and condenser C3 in parallel, through connector 27 to the connector 16 for the arm of potentiometer P1 to establish a cross connection to the grid of tube V2 from the transformer T1 in the anode circuit of tube V1. It will be seen that the cathodes of tubes V1 and V2, illustratively, are in a loop circuit with the secondary of transformer T4 having a median center tap connection, with said cathodes each bridged by a potentiometer, the arms of which are in the respective cathode-grid circuits of the respective tubes.

The twin triode V3 has been mentioned. Any other desired form of amplifier, of course, can be used, and V3 is purely illustrative. The filament thereof is heated by the output of a small secondary 49 of the transformer T5. Secondary 49 also leads by connector 30 to terminal B1 of the board 31, and by connector 32 through the primary turns of a balancing, remote control, differential transformer, to be described, B. D. T., and to terminal B2 on board 31. A larger secondary 59 is provided for transformer T5, one lead 34 from which is connected to the grid 1 and anode 2 of one side of the twin triode tube V3. The other end of transformer secondary 59 leads by connector 33 to one side of the condensers C10 and C11, to ground, to one side of resistance R6 and condenser C12 in parallel, to one end of potentiometer P3, and to one output side of the secondary of a transformer T6. A condenser C9 is disposed parallel to the said secondary of transformer T6 and these are joined by connector 35 leading to the other end of potentiometer P3. The arm of potentiometer P3 leads to the other grid 4 of the tube V3. The anode 5 of tube V3 leads to one end of the primary of transformer T3. The other end of said primary leads by connector 36 to one end of resistance R3 bridging condensers C10 and C11, and to a terminal of condenser C10. Condenser C11 on the opposite side thereof from the connector 35, by a connector 37, leads past the other end of resistance R3 to the cathode 3 of the tube V3.

The balancing differential remote control transformer B. D. T. has secondaries with opposing outputs, and one terminal output thereof connects to terminal B3 and the other leads in series through the primary of transformer T6, back to terminal board 31 at B4. The output of the secondaries of this transformer is controlled by the adjustment of the armature 40 axially of the turns of the differential transformer, as will be understood. The location of B. D. T. may be at any desired point relative to the work, even at quite remote positions relative thereto. The position of armature 40 thereof may be controlled in any desired manner, whether manually or mechanically as desired. Its function is to establish a datum tension condition relative to which plus or minus values of tension or other variable can be established by the pick-up to be described. It is preferred, but is not essential to use a differential transformer according to the teachings of my co-pending application Serial Number 61,835, maturing as Patent No. 2,568,587, on September 18, 1951.

The pick-up or transmitter T. D. T., preferably comprises a differential transformer similar to the remote control transformer B. D. T. The pick-up or transmitter transformer T. D. T. has an armature core 41, the axially adjusted position of which is controlled by the tension or output motion of the particular variable device with which it is associated. In the purely illustrative case of a web of variable tension, it may be actuated by a roller, contacting and suitably biased, against, the web so that as the web relatively tightens or loosens, the armature position shifts, according to the direction of desired signal. A pair of primary coils are provided connected in series with the terminals B1 and B2 of the terminal board 31, so as to be energized by the small secondary 49 of the transformer T5 with which they are thus in series through the primaries of the balancing remote control transformer. The secondaries of the pick-up transformer T. D. T. are coupled in mutual bucking relation and one output lead connects with terminal B4 of the board 31, while the other connects with terminal B3 thereof. The secondaries of the remote control transformer B. D. T. and pick-up or transmitter transformer T. D. T. are thus in series, in mutually bucking and cancelling relation. As noted, the setting of the armature 40 of the balancing or remote control transformer B. D. T. determines the datum point relative to which the armature 41 of the pick-up transformer has null output relation. In other words, if the illustrative web tension, for instance, is to be controlled relative to a slack tension, the setting of the armature 40 is set for one output, relative to which the pick-up varies on either side of the thus established datum, whereas if the armature 40 is set for a relatively tight-tensioned device, then the armature 41 must be adjusted to furnish an output relative to the changed datum.

In operation, the closing of the circuit from lines L1 and L2 energizes the time delay relay TDc while energizing the primaries of the transformers T4 and T5. The energization of the former heats the cathodes of the tubes V1 and V2, and, variable with the setting of the arms of the respective potentiometers, applies a critically adjusted A. C. grid bias to the respective tubes. The energization of the transformer T5 energizes the primaries of the two differential transformers, as well as heating the filament of the twin triode tube V3. It will be observed that one half of the twin triode tube V3 serves as a rectifier and the other half furnishes amplified signals on the primary of the transformer T3. In a predetermined few seconds after the closing of the L1—L2 circuit, the relay TDc functions to close the switch TDs, to close a power circuit to the armature A of the motor M on one side and to the respective cathodes of the tubes V1 and V2 on the other. At this point, with no signal on the primary of transformer T6, there will be no signal on the primary of transformer T3, and by reason of the bias on the grids of the tubes V1 and V2 neither will fire and the motor M remains stationary.

It may be assumed that at this point the prime mover, such as the illustrative tensioned web, is at a satisfactory datum condition and no fluctuations from this datum have occurred so that the outputs of the two differential transformers are mutually cancelling. If it be desired to change the datum, the armature 40 of transformer B. D. T. is axially adjusted the minute amount necessary to secure the desired degree of unbalance of the circuit necessary to cause the pick-up transformer to move to reestablish the balanced condition and thus to actuate the motor M in the sense and to the degree necessary to modify the condition of the prime mover to accord with the new datum. In the illustrative case, this motor running changes the drive ratio on one of the motors feeding and tensioning the web. On the other hand, the change of condition of the prime mover in deviating from the datum condition will cause small motions of the armature 41 of the pick-up transformer T. D. T. In either of these cases, there will be unbalance of the outputs of the two differential transformers causing an A. C. signal to appear in the primary of transformer T6. This will cause an amplified signal to appear in the primary of transformer T3. The secondaries 29 and 39 thereof then transfer the A. C. signal to the respective grids of the tubes V1 and V2. Owing to the arrangement of the leads from the transformer secondaries 29 and 39, however, it will be seen that with one phase relation in the primary of transformer T3 relative to the phase of the grid bias, the outputs from the respective secondaries 29 and 39 impress an effectively plus voltage on the grid of tube V1 or V2, while simultaneously an effectively negative voltage is applied to the grid of the other tube V2 or V1. The tube which is thus energized positively on the grid fires and discharges a pulse or series of pulses through the anode and into the anode circuit of that particular tube.

Let it be assumed that it is tube V1 upon the grid of which the effectively positive signal has been placed. The motor controlling circuit through tube V1 is then from line L3 through switch TDs, line 10, connector 11, the cathode of tube V1, to the anode of this tube, through the primary of transformer T1, through field B, armature A, connector 12, back to the line L4.

Assuming that it is tube V2 upon the grid of which the instantaneous effectively positive pulses are placed, the circuit through this tube is then from line L3 through switch TDs, line 10, connector 11, the cathode of tube V2 to the anode thereof, through the primary of transformer T2, field C, armature A and connector 12 back to the line L4.

The important functions of the transformers T1 and T2 will be apparent. These comprise "lock-out" transformers, in the sense that the transmission of a pulse or series of pulses through the primary of one transformer T1 or T2 impresses a negative pulse on the grid of the unfired tube of the two tubes V1 and V2, increasing the negative bias already on the grid of the unfired tube to prevent the tube so biased from any inadvertent firing. This prevents both tubes from firing at the same time and insures that only D. C. pulses of the proper polarity are applied to the selected field and armature in series.

The functioning of the system utilizes in its speed control the effective shifting phase of the resultant voltage on the grids of the gas tubes V1 and V2, formed by the relation of the phase of the established grid bias as varyingly modified by the transmitter signal. Assume a sine wave of the grid bias, illustratively substantially 180° out of phase with the plate voltage, and a signal voltage approximately 90° out of phase with both. It will be seen that during the intervals both the plate and the resultant grid voltages are effectively positive simultaneously there will be a power pulse transmitted, and the width or duration of the pulse representing power input through the windings of the motor, will vary in accordance with the amplitude of the signal voltage. That is, with weak signal voltage the resultant voltage on the grid shifts with relation to the plate voltage phase so that the pulse is narrow and weak, and progressively increases in duration or width as the amplitude of the amplified signal from the pick-up transmitter increases. The crest of the positive phase of the resultant grid voltage shifts relative to the phase of the plate voltage with transmitter amplitude changes and therefore changes the output of the tubes as to duration of each pulse, so that the speed of the motor M is closely and accurately controlled.

At maximum pick-up or transmitter amplitude, the given tube is discharging at maximum capacity and the motor speeds increase proportionately to the increase in amplitude of the controlling signal. On the other hand, as the amplitudes of the signal of given phase from the controlling differential transformer decrease, for instance with recovery of part of the change of the variable causing the initial unbalance, the motor speed is proportionately reduced, until with attainment of a substantially null output from the transmitting or controlling pick-up unit, both tubes are biased against firing and the motor comes to a stop. It will be clear that if the variable over shoots and departs from the datum in the opposite sense, the other tube of the tubes V1 and V2 fires and starts the motor running in the other direction.

It will be understood that the rate of firing pulse production due to the signal from the amplifier circuit will be affected by the rate of decay of the instantaneously energized motor field. As this is transitory, and a function of the mechanical and magnetic characteristics of the motor, the pulse retarding feed back time is relatively short. This is in contrast to the controlling mechanical characteristics, friction, etc. of the shunt motor of the said co-pending application, which effects a much greater change in the rate of firing pulses according to the instantaneous running conditions of said motor.

While it is preferred to incorporate a reversible series wound motor, the invention is perfectly adapted to running a series motor continuously between zero and full speed in one direction. In this latter case, the circuit is simplified. Only one gas tube is needed, and, of course, the lock-out transformers T1 and T2 are omitted, with the omission of the reversing motor field.

Reference has been made to the remote control datum-establishing differential transformer, and it will be seen that this is not an essential in the broadest aspects of the invention. If there is but one datum point for the variable, the initial setting of the pick-up transformer relative to its armature will suffice to establish a null output with datum armature position. On the other hand, changes in the datum can be made by repositioning the stator of the transformer T. D. T. relative to its armature. This may not be convenient owing to the proximity of the work thereto, so that for general purposes the remotely controlled differential transformer may be preferred. This may well be positioned long distances from the work itself, as small wires carrying small currents for long distances are adequate to bring the output of the balancing transformer into bucking relation to the pick-up transformer.

It will be seen that the circuit described has a minimum number of tubes, uses small transformers, and is a cheap system to construct, while being highly efficient and accurate in sharply controlling the running of the series wound D. C. motor disclosed.

Having thus described my invention, I claim:

1. A motor-regulating circuit for running a series wound D. C. motor in one direction with variable speed, comprising a network, a movable element differential transformer in the network having a position of substantially null output and an output of given phase and varying amplitude with one sense and degree of departure of the movable element of the transformer from the null output position, a gas tube in the network, a series wound D. C. motor in the network, means connecting the cathode anode circuit of the tube to a field and the armature of the D. C. motor in series, and means in the network responsive to the A. C. signal from the differential transformer for firing the tube for running the said motor at a rate proportional to the amplitude of the signal from said transformer.

2. An electronic motor-regulating circuit comprising a network, a movable element differential transformer in the network and having an output variable in phase and amplitude on both sides of a substantially null output with relative movements of the movable element, a reversible D. C. motor in said network having a first field and a second field respectively series connected with an armature thereof, contactless electronic means in the network responsive to signals from the transformer for energizing a selected field and the armature for running the motor at a speed and in a direction related to the amplitude and phase of the output from said transformer, said means comprising a first and a second gas tube, connections from the first tube to the first said field, connections from the said second tube to the second said field, means for applying a variable A. C. grid bias to both tubes, and means for applying the A. C. signals from said transformer to the grids of the respective tubes instantaneously effectively positive only on the grid of the one tube related with the selected field of said motor determined by the phase of the signal from said transformer and the desired direction of running said motor.

3. A D. C. motor-regulating circuit comprising a network, a series wound reversible D. C. motor in the network and having two fields and an armature in series relation, a first gas tube the anode of which is connected to the first field, a second gas tube the anode of which is connected to the second field, means in the network forming the cathode-anode circuit of both tubes, connections from a power line in the network respectively to the respective cathodes of the tubes and to the armature of the motor, means establishing the grid cathod circuit of the respective tubes including means for impressing variable A. C. grid bias on the respective tubes, a movable element differential transformer having an output of phase and amplitude determined by the positioning of the movable element, means in the network for impressing an amplified signal from the transformer with instantaneously opposite phases on the respective grids of the tubes so that the tube on the grid of which the effectual positive phase is impressed is fired to complete a power circuit through the cathode and anode of said firing tube through a selected field and the armature of the motor to run it in a given direction.

4. A D. C. motor-regulating circuit comprising a network, a series wound reversible D. C. motor in the network and having two fields and an armature in series relation, a first gas tube the anode of which is connected to the first field, a second gas tube the anode of which is connected to the second field, means in the network forming the cathode-anode circuit of both tubes, connections from a power line in the ntwork respectively to the respective cathodes of the tubes and to the armature of the motor, means establishing the grid cathode circuit of the respective tubes including means for impressing a variable A. C. grid bias on the respective tubes, and means in the network for impressing an effectively positive pulse in the grid of a selected tube only to cause firing of the selected tube and the completion of a power circuit through the cathode-anode circuit of the selected tube through the selected field and armature of the motor in series to run the motor in one direction.

5. A D. C. motor-regulating circuit comprising a network, a series wound reversible D. C. motor having a first and a second field and a series connected armature in the network, a first multi-element gas tube the anode-cathode circuit of which is connected to the first said field, a second multi-element gas tube the anode-cathode circuit of which is connected to the said second field, means in the network including means for impressing an adjustable A. C. bias on the grid in the grid-cathode circuit of the first tube, means in the network including a potentiometer for impressing an adjustable A. C. grid bias on the grid in the grid cathode circuit of the second tube, signalling means in the network for impressing polarized signal pulses of respectively instantaneously substantially opposite polarities on the grids of the respective tubes whereby the tube on which the grid receives positive pulses fires to complete the cathode anode circuit through the selected field and armature of the motor to run the motor in one direction, and connections in the network for a source of A. C. to energize the network and run the motor.

6. A D. C. motor-regulating circuit comprising a network, a series wound reversible D. C. motor having a first and a second field and a series connected armature in the network, a first multi-element gas tube the anode-cathode circuit of which is connected to the first said field, a second multi-element gas tube the anode-cathode circuit of which is connected to the said second field, means in the network for impressing an adjustable A. C. bias on the grid in the grid-cathode circuit of the first tube, means in the network for impressing an adjustable A. C. grid bias on the grid in the grid-cathode circuit of the second tube, signalling means in the network for impressing polarized signal pulses of respectively instantaneously substantially opposite polarities on the grids of the respective tubes whereby the tube on which the grid receives positive pulses fires to complete the cathode-anode circuit through the selected field and armature of the motor to run the motor in one direction, and connections in the network for a source of A. C. to energize the network and run the motor, said signallying means comprising a movable element differential transformer and an amplifier in the network.

7. A D. C. motor-regulating circuit comprising a network, a series wound reversible D. C. motor having a first and a second field and a series connected armature in the network, a first multi-element gas tube the anode-cathode circuit of which is connected to the first said field, a second multi-element gas tube the anode-cathode circuit of which is connected to the said second field, means in the network for impressing an adjustable A. C. bias on the grid in the grid-cathode circuit of the first tube, means in the network for impressing an adjustable A. C. grid bias on the grid in the grid cathode circuit of the second tube, signalling means in the network for impressing polarized signal pulses of respectively instantaneously substantially opposite polarities on the grids of the respective tubes whereby the tube on which the grid receives positive pulses fires to complete the cathode-anode circuit through the selected field and armature of the motor to run the motor in one direction, and connections in the network for a source of A. C. to energize the network and run the motor, said signalling means comprising a first and a second movable element transformer the outputs of which are in bucking relation, one of said differential transformers being adjustable to establish a datum signal, the other of said differential transformers having a movable element adjustable in response to change of condition of a variable, and an amplifier in the network.

8. A D. C. motor-regulating circuit comprising a network, a series wound reversible D. C. motor having a first and a second field and a series connected armature in the network, a first multi-element gas tube the anode-cathode circuit of which is connected to the first said field, a second multi-element gas tube the anode-cathode circuit of which is connected to the said second field, means in the network for impressing an adjustable A. C. bias on the grid in the grid-cathode circuit of the first tube, means in the network for impressing an adjustable A. C. grid bias on the grid in the grid cathode circuit of the second tube, signalling means in the network for impressing polarized signal pulses of respectively instantaneously substantially opposite polarities on the grids of the respective tubes whereby the tube on which the grid receives positive pulses fires to complete the cathode-anode circuit through the selected field and armature of the motor to run the motor in one direction, and connections in the network for a source of A. C. to energize the network and run the motor, and means in the cathode-anode circuit of one tube coupled to the grid of the other tube for impressing an instantaneously negative pulse on said last grid to increase the negative grid bias of said other tube to prevent same from firing while the first tube fires.

9. A D. C. motor regulating circuit comprising a network, connections in the network for a source of A. C., a series wound reversible motor having a first field and a second field series connected to an armature in the network, a first tube, connections in the network for the cathode-anode circuit of said tube with the first field and armature of said motor, a second tube, connections in the network for the cathode-anode circuit of the second tube with the second field and armature of said motor, means in the network for impressing a variable voltage on the grid-cathode circuit of said first tube instantaneously of substantially opposite phase from the cathode-anode circuit to establish a negative grid bias on said first tube, second means in the network including for impressing a variable voltage on the grid-cathode circuit of said second tube instantaneously of substantially opposite phase from that of the cathode-anode circuit of said second tube to establish a negative grid bias on said second tube, a movable element transformer having an output varying from a substantially null output to an output of given or substantially opposite phase and of varying amplitude with movement of the movable element of the transformer, an amplifying circuit in the network for applying the signals of the said transformer as pulses on the respective grids of the respective tubes in the network instantaneously of substantially opposite polarities on the respective grids whereby the tube on which the pulses are effectively positive fires, and with the duration of pulses passing through the anode-cathode circuit of the firing tubes proportional to the amplitude of the signal from said transformer.

10. A D. C. motor-regulating circuit comprising a network, connections in the network for a source of A. C., a series wound reversible motor having a first field and a second field series connected to an armature in the network, a first tube, connections in the network for the cathode-anode circuit of said tube with the first field and armature of said motor, a second tube, connections in the network for the cathode-anode circuit of the second tube with the second field and armature of said motor, means in the network for impressing a variable A. C. voltage on the grid-cathode circuit of said first tube intantaneously of substantially opposite phase from the cathode-anode circuit to establish an A. C. grid bias on said first tube, second means in the network for impressing a variable A. C. voltage on the grid-cathode circuit of said second tube instantaneously of substantially opposite phase from that of the cathode-anode circuit of said second tube to establish an A. C. grid bias on said second tube, a movable element transformer having an output varying from a substantially null output to an output of given or substantially opposite phase and of varying amplitude with movements of the movable element of the transformer, an amplifying circuit in the network for applying the signals of the said transformer as pulses on the respective grids of the respective tubes in the network instantaneously of substantially opposite polarities on the respective grids whereby the tube on which the pulses are effectively positive fires, and with the duration of pulses passing through the anode-cathode circuit of the firing tubes proportional to the amplitude of the signal from said transformer, transformers in each cathode-anode circuit of each tube, and connections in the network from the respective last mentioned transformers to the grid of the opposite tube whereby the firing of one tube impresses a negative pulse on the grid of the other tube to enhance the negative grid bias thereon to preclude firing of both tubes simultaneously.

WILLIAM D. MACGEORGE.

References Cited in the file of this patent

UNITED STATES PATENTS

| Number | Name | Date |
| --- | --- | --- |
| 2,287,459 | Vehling | June 23, 1942 |
| 2,399,675 | Hays | May 7, 1946 |
| 2,431,578 | Moyer et al. | Nov. 25, 1947 |
| 2,437,140 | Waldie | Mar. 2, 1948 |
| 2,493,575 | Edwards | Jan. 31, 1950 |

FOREIGN PATENTS

| Number | Country | Date |
| --- | --- | --- |
| 401,016 | Great Britain | Nov. 9, 1933 |